(12) United States Patent
Bokhari

(10) Patent No.: US 10,772,297 B2
(45) Date of Patent: Sep. 15, 2020

(54) FLUID DISPENSING PET BRUSH

(71) Applicant: Shahid Bokhari, Pittsburg, PA (US)

(72) Inventor: Shahid Bokhari, Pittsburg, PA (US)

( * ) Notice: Subject to any disclaimer, the term of this patent is extended or adjusted under 35 U.S.C. 154(b) by 249 days.

(21) Appl. No.: 16/051,441

(22) Filed: Jul. 31, 2018

(65) Prior Publication Data

US 2019/0059323 A1 Feb. 28, 2019

Related U.S. Application Data

(60) Provisional application No. 62/553,082, filed on Aug. 31, 2017.

(51) Int. Cl.
*A01K 13/00* (2006.01)
*A46B 11/00* (2006.01)

(52) U.S. Cl.
CPC .......... *A01K 13/003* (2013.01); *A01K 13/002* (2013.01); *A46B 11/002* (2013.01); *A46B 11/0062* (2013.01); *A46B 2200/1093* (2013.01)

(58) Field of Classification Search
CPC .... A01K 13/003; A01K 13/002; A01K 13/00; A01K 13/001
See application file for complete search history.

(56) References Cited

U.S. PATENT DOCUMENTS

| | | | |
|---|---|---|---|
| 6,948,451 B2 * | 9/2005 | Bond | A01K 13/001 101/289 |
| 7,740,412 B2 | 6/2010 | Hoadley et al. | |
| 7,784,141 B2 | 8/2010 | Knopow et al. | |
| 7,926,492 B2 * | 4/2011 | Hurwitz | A01K 13/002 132/112 |
| 8,418,654 B2 * | 4/2013 | Hurwitz | A01K 13/001 119/603 |
| 8,990,998 B1 * | 3/2015 | McBride, Jr. | A47L 13/256 15/104.94 |
| 9,433,191 B2 | 9/2016 | Frye | |
| 9,433,281 B1 * | 9/2016 | Barras | A46B 11/063 |
| 2006/0133886 A1 * | 6/2006 | Willinger | A46B 11/0062 401/186 |
| 2008/0052850 A1 | 3/2008 | McKay | |
| 2010/0143024 A1 | 6/2010 | Hurwitz | |

* cited by examiner

*Primary Examiner* — Monica L Barlow
(74) *Attorney, Agent, or Firm* — Inspired Idea Solutions Law Firm; Wayne Carroll

(57) ABSTRACT

An apparatus for cleaning animals useful for simultaneously brushing and applying a fluid to a pet's coat. The device is a brush shaped like a cone with rounded contours having metal bristles with rounded tips. In addition to the bristles, the brush includes fluid conduits which run parallel to the bristles. The conduits are attached to a fluid reservoir housed in the body of the brush or in a handle attached to the brush. In some embodiments, the fluid may be contained in a cartridge. A button may be included to selectively dispense the fluid, through use of a manual pump or an electric motor. A disposable pad may be attached to the exterior of the brush, allowing the metal bristles to pass through the pad. The pad may attach using hook-and-loop fasteners or some other type of adhesive. The device is particularly useful for cleaning dogs.

20 Claims, 5 Drawing Sheets

FLUID DISPENSING PET BRUSH

CROSS REFERENCE TO RELATED APPLICATION

The present application is related to and claims priority to U.S. Provisional Patent Application No. 62/553,082 filed Aug. 31, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of hairbrushes and more specifically relates to a fluid-dispensing pet brush.

2. Description of Related Art

A brush is a type of cleaning tool which utilizes bristles. Brushes may be used to clean hair, skin, and inanimate surfaces, or may be used to apply a material such as paint, or prepare a surface. Brushes are extremely versatile and can be adapted to a wide variety of purposes. A typical brush includes a handle, a head, and filaments known as bristles which are attached to the head. The handle allows the brush to be gripped in a way that allows a user to engage an object to be cleaned with the bristles. The bristles of the brush may be composed of a variety of materials, as is suitable for the intended application of the brush. Most basic brushes, however, are limited in function, usually relying only on abrasion between the bristles and the surface to clean. As a result, some difficult-to-clean objects may require multiple tools and materials to be suitably cleaned. Complex and expensive cleaning regimens can result. A suitable solution is desired.

U.S. Pat No. 9,433,191 to John Clifton Frye relates to an applicator for applying cleaning, disinfecting and pet care solutions. The described applicator for applying cleaning, disinfecting and pet care solutions includes a device that integrates a manually operable fluid dispenser for dispensing and applying a contained fluid to clean and/or disinfect a surface or care for a pet's fur coat. The device is preferably equipped with washable and reusable cleaning pads or various combing and brushing appliances thus obviating the need for a separate cleaning cloth or brush/comb.

BRIEF SUMMARY OF THE INVENTION

In view of the foregoing disadvantages inherent in the known hairbrush art, the present disclosure provides a novel fluid dispensing pet brush. The general purpose of the present disclosure, which will be described subsequently in greater detail, is to provide a pet cleaning device useful for simultaneously brushing and applying a fluid to a pet's coat. The device may comprise a brush shaped like a cone with rounded contours having metal bristles with rounded tips. In addition to the bristles, the brush includes fluid conduits which run parallel to the bristles and measure about a quarter of the length of the bristles. The conduits are attached to a fluid reservoir housed in the body of the brush or in a handle attached to the brush. in some embodiments, the fluid may be contained in a cartridge. A button may be included to selectively dispense the fluid, through use of a manual pump or an electric motor. A disposable pad may be attached to the exterior of the brush, allowing the metal bristles to pass through the pad. The pad may attach using hook-and-loop fasteners or some other type of adhesive. The device is particularly useful for cleaning dogs.

An apparatus for cleaning animals is disclosed herein. The apparatus for cleaning animals includes an applicating brush including a handle having a chamber, a proximal end, and a distal end; the distal end having a brush head interface; a substantially conical triangular head having a head surface, a plurality of bristles, a plurality of conduits, a brush handle interface, and a releasable pad attachment means; at least one disposable absorbent pad having a plurality of apertures, and a corresponding releasable pad attachment means. The handle may be removably affixable to the substantially conical triangular head; wherein the chamber of the handle may be configured to receive a solution and may be in fluid communication with the plurality of conduits. The substantially conical triangular head includes passages which are in fluid communication with the plurality of conduits and with the chamber. The at least one disposable absorbent pad may be removably affixable to the head surface of the substantially conical triangular head and in such a way that the plurality of bristles extend through the plurality of apertures.

A method of using the apparatus for cleaning animals is also disclosed herein. The method of using apparatus for cleaning animals may comprise the steps of: providing an apparatus for cleaning animals, the apparatus comprising: an applicating brush including a handle which may have a chamber, a proximal end, and a distal end. The distal end may have a brush head interface; a substantially conical triangular head may have a head surface, a plurality of bristles, a plurality of conduits, a brush handle interface, and a releasable pad attachment means. At least one disposable absorbent pad may have a plurality of apertures, a corresponding releasable pad attachment means. The handle may be removably affixable to the substantially conical triangular head; wherein the chamber of the handle may be configured to receive a solution and may be in fluid communication with the plurality of conduits. The substantially conical triangular head includes passages which are in fluid communication with the plurality of conduits and with the chamber. The at least one disposable absorbent pad may be removably affixable to the head surface of the substantially conical triangular head and in such a way that the plurality of bristles and the plurality of conduits extend through the plurality of apertures; inserting the solution into the chamber of the handle; affixing the handle to the substantially conical triangular head; affixing the at least one disposable absorbent pad to the substantially conical triangular head; pumping the solution through the plurality of conduits; and brushing an animal's fur. The method may further comprise the steps of: removing the at least one disposable absorbent pad from the substantially conical triangular head when the pad becomes soiled; and replacing the at least one disposable absorbent pad with a clean pad.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fluid dispensing pet brush, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to hairbrushes and more particularly to a fluid dispensing pet brush as used to improve the fluid-dispensing on to the hair of a pet.

The present invention advantageously fills the aforementioned deficiencies by providing a pet brush with advantages in applying cleaning solutions and removing loose hair. The present invention is superior to other systems in that it effectively simultaneously brushes and cleans a pet's coat while also being simple to use and clean. The present invention provides a pet cleaning device useful for simultaneously brushing and applying a fluid to a pet's coat.

The device may comprise a brush shaped like a cone with rounded contours having metal bristles with rounded tips. The cone shape is ergonomically advantageous for easily brushing the pet while also having an aesthetically pleasing design. In addition to the bristles, the brush includes fluid conduits which run parallel to the bristles and measure about a quarter of the length of the bristles. The conduits are attached to a fluid reservoir housed in the body of the brush or in a handle attached to the brush.

In some embodiments, the fluid may be contained in a cartridge. In the case of a reservoir, the handle may have a sealed opening that may be used to refill the reservoir. In the cartridge embodiment, the cartridge may be disposable and replaceable when the fluid is depleted. A button may be included to selectively dispense the fluid, through use of a manual pump or an electric motor.

A disposable pad may be attached to the exterior of the brush, allowing the metal bristles to pass through the pad. The pad may attach using hook-and-loop fasteners or some other type of adhesive. The device is particularly useful for cleaning dogs.

The primary advantage of the brush is the ability to brush hair and apply a cleaning solution simultaneously with a single device. Additionally, the use of the disposable membrane retains the cleaning solution in an absorbent article so that it is not wasted. Because any hair accumulated on the brush will be attached to the membrane and excess cleaning solution will be absorbed by the membrane, the brush can also be readily cleaned by simply replacing the disposable membrane.

Figure 1:
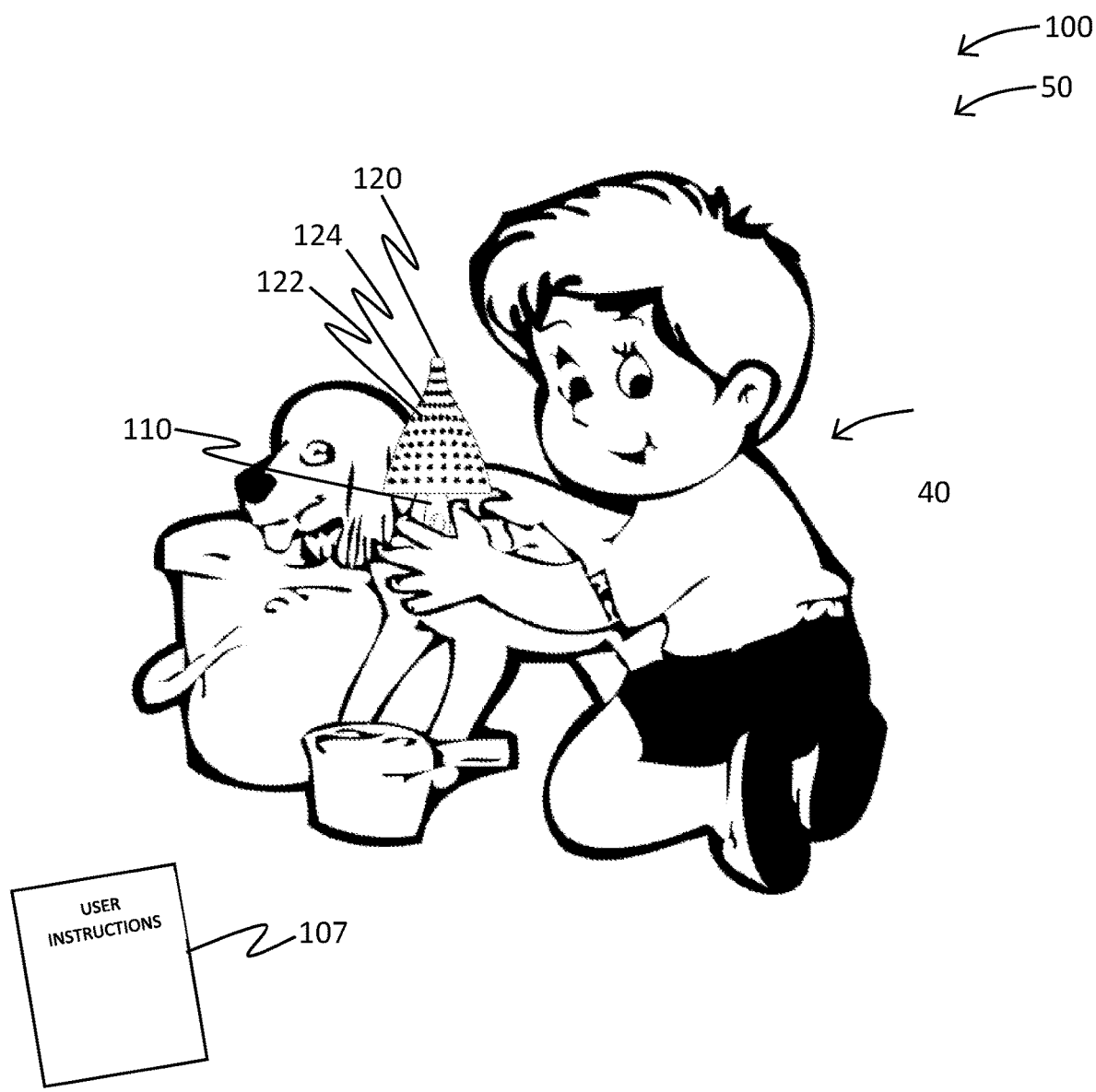
FIG. 1 is a perspective view of the apparatus for cleaning animals during an 'in-use' condition, according to an embodiment of the disclosure.

Referring now more specifically to the drawings by numerals of reference, there is shown in FIGS. 1-4, various views of an apparatus for cleaning animals 100. FIG. 1 shows the apparatus for cleaning animals 100 during an 'in-use' condition 50 by a user 40, according to an embodiment of the present disclosure. As illustrated, the apparatus for cleaning animals 100 may include a handle 110, a substantially conical triangular head 120, and a disposable absorbent pad 130.

The handle 110 is removably affixable to the substantially conical triangular head 120 and has a proximal end and a distal end. The handle 110 also includes a brush head interface 114, and a chamber 112 which is configured to receive a solution which is substantially fluid and is in fluid communication with a plurality of conduits 126 which are included in the substantially conical triangular head 120. The chamber 112 may be a reservoir which is configured to receive and contain a solution. The fluid communication is achieved through passages between the chamber 112 and the plurality of conduits 126. In addition to the plurality of conduits 126, the substantially conical triangular head 120 also has a head surface 122, a plurality of bristles 124, a brush handle interface 128 and a releasable pad attachment means such as hook and loop material. The disposable absorbent pad 130 can be removably affixed to the head surface 122 and includes a plurality of apertures 132 which are configured to allow the metal bristles 125 to extend through the plurality of apertures 132.

According to one embodiment, the apparatus for cleaning animals 100 may be arranged as a kit. The kit may include a set of instructions 107 and an applicating brush. The instructions may detail functional relationships in relation to the structure of the apparatus for cleaning animals 100 (such that the apparatus for cleaning animals 100 can be used, maintained, or the like, in a preferred manner).

Figure 2:
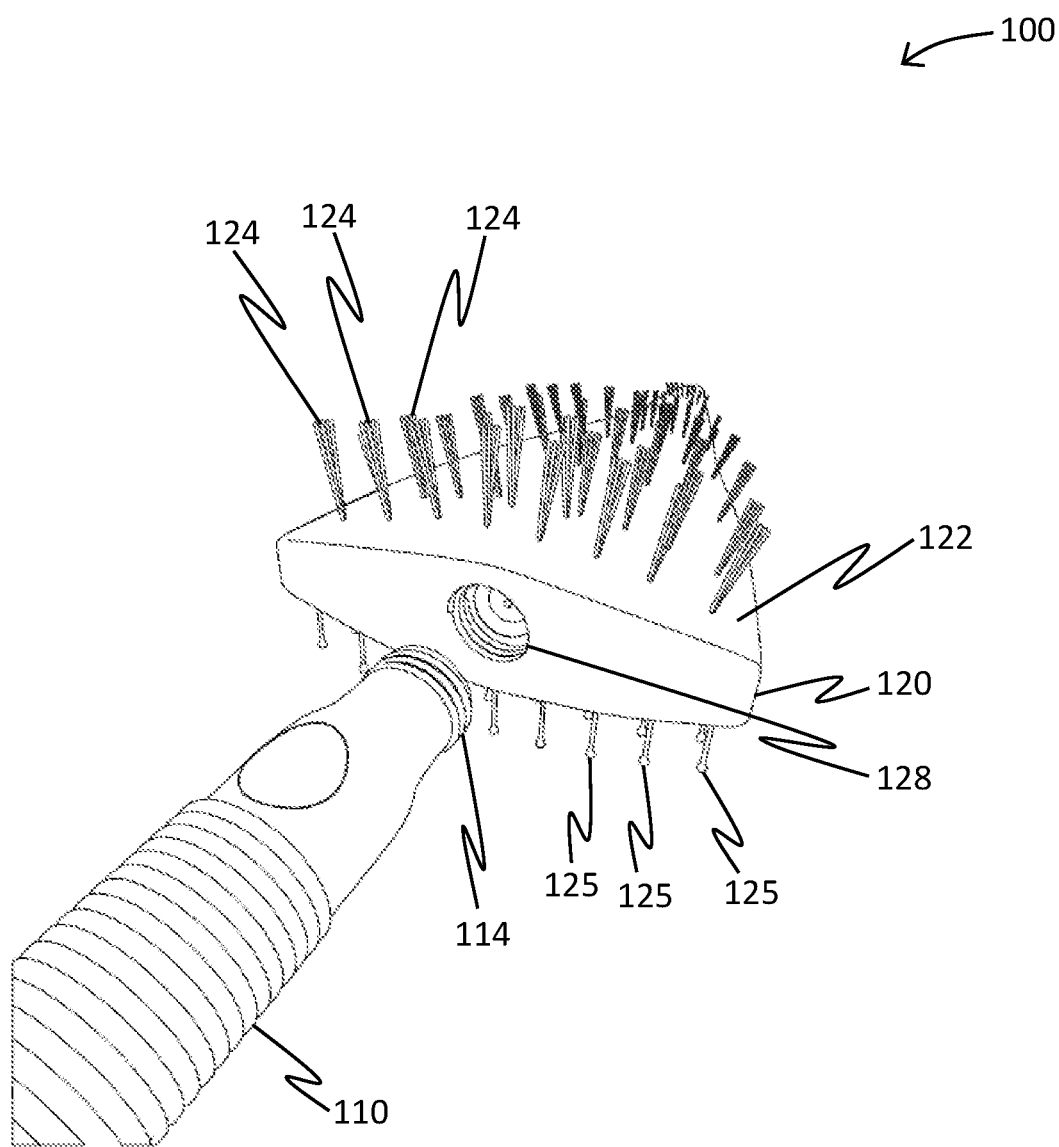
FIG. 2 is a bottom view of the apparatus for cleaning animals of FIG. 1, according to an embodiment of the present disclosure.

Referring now to FIG. 2 showing a rear perspective view of the apparatus for cleaning animals 100 of FIG. 1, according to an embodiment of the present disclosure. As above, the apparatus for cleaning animals 100 may include a handle 110, a substantially conical triangular head 120, and a disposable absorbent pad 130. Included in the handle 110 may be a pump which is in fluid communication with the chamber 112 of the handle 110. This pump may be manually powered and used with an included pumping-button, or electrically powered via an included battery and motor which are in electrical communication with each other and an activation button. The chamber 112 of the handle 110 is configured to receive a solution, which may be substantially fluid, or in some embodiments may be provided in a cartridge. In such an embodiment the chamber 112 would be configured to receive the cartridge. The plurality of bristles 125 may be made of ferrous material and include a substantially spherical tip. The plurality of bristles 124 may alternatively be made of non-ferrous 124 material or may include a plurality of bristles made of ferrous 125 and non-ferrous 124 materials. The plurality of conduits 126 (FIG. 4) are positioned so that they are directly adjacent to said plurality of bristles 125.

Figure 4:
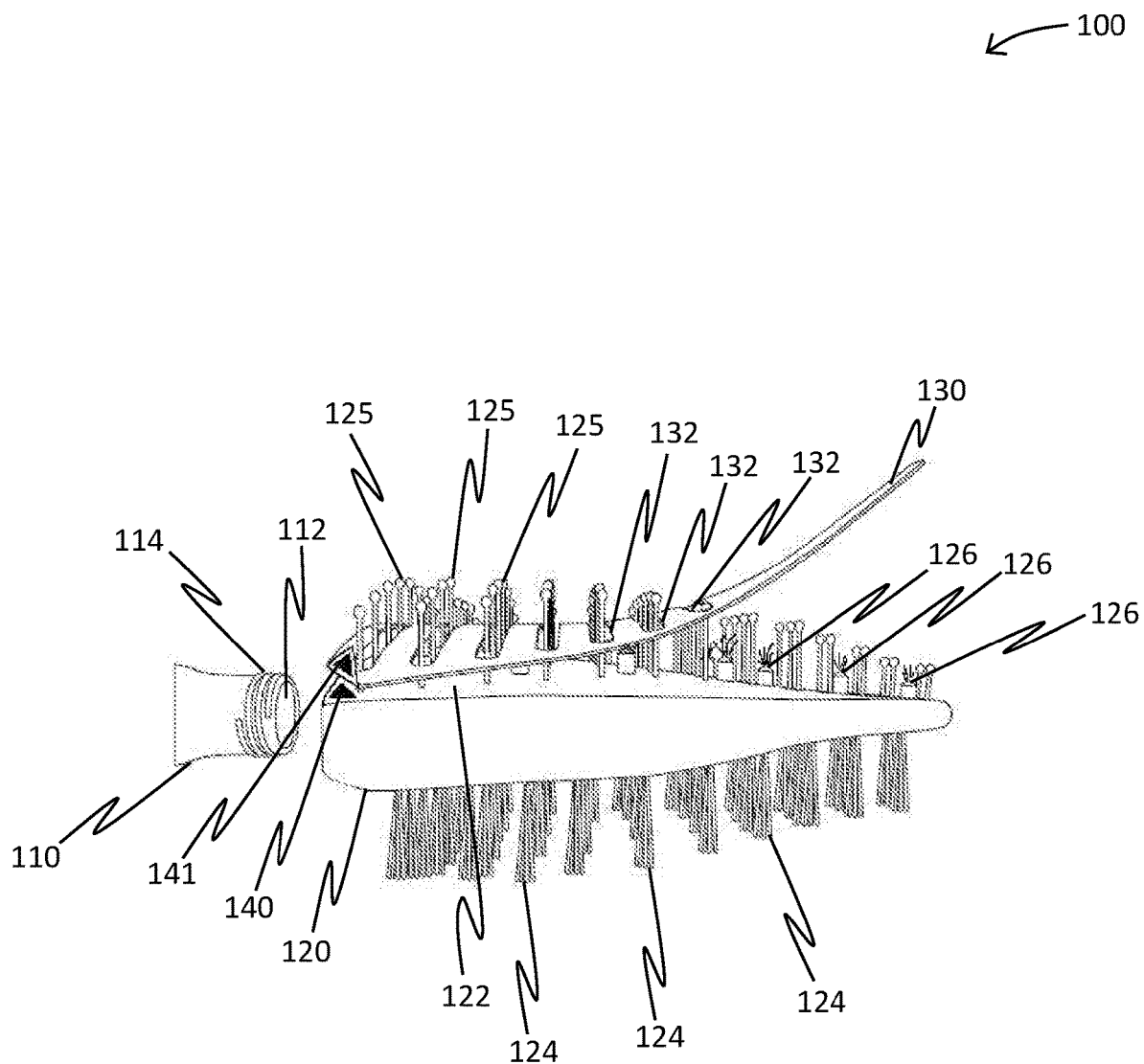
FIG. 4 is a side view of the apparatus for cleaning animals of FIG. 1, according to an embodiment of the present disclosure.

Additionally, the disposable absorbent pad 130 (FIG. 4) can be affixed to the substantially conical triangular head 120 via a releasable pad attachment means 140 (FIG. 4) on the substantially conical triangular head 120 and with a corresponding releasable pad attachment means 141 (FIG. 4) on the disposable absorbent pad 130 (FIG. 4). The releasable pad attachment means 140 (FIG. 4) and corresponding releasable pad attachment means 141 (FIG. 4) may comprise hook and loop fasteners and be configured to attach on the side of the brush having metal bristles 125. While brushing, a user 40 (FIG. 1) can use the activation button or pumping button to pump the solution from the chamber 112 of the handle 110 through passageways in the substantially conical triangular head 120 and out through the plurality of conduits 126 (FIG. 4) where it can interact with the plurality of bristles 125 (FIG. 4) and the animal's fur.

Figure 3:
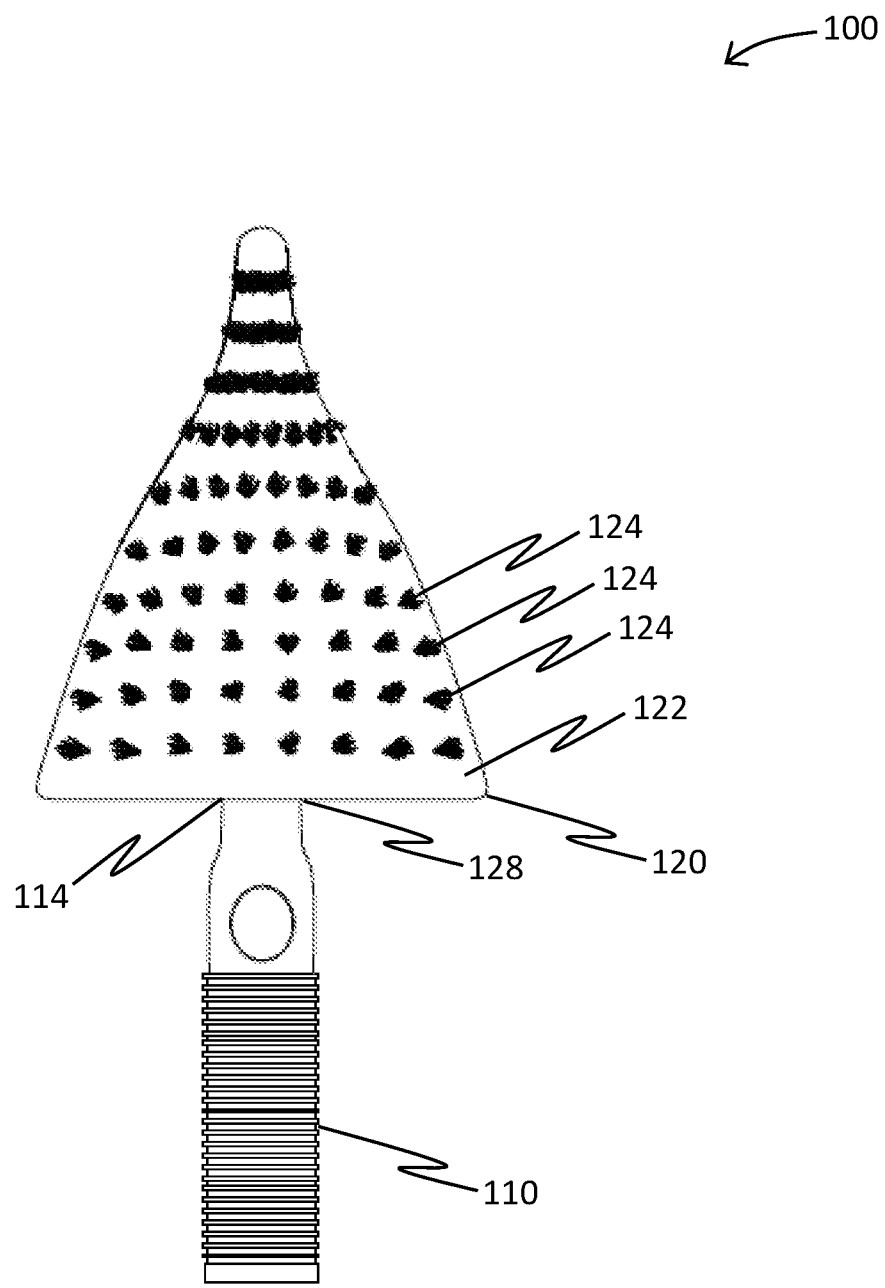
FIG. 3 is a front view of the apparatus for cleaning animals of FIG. 1, according to an embodiment of the present disclosure.

FIG. 3 shows a rear view of the apparatus for cleaning animals 100 of FIG. 1, according to an embodiment of the present disclosure. As above, the apparatus for cleaning animals 100 may include a handle 110, a substantially conical triangular head 120, and a disposable absorbent pad 130 (FIG. 4). The apparatus 100 may be used to brush an animal's fur and apply a solution such as a cleaning agent directly onto the animal. The rear view shows the side of the substantially conical triangular head 120 having the plurality of bristles made of non-ferrous material 124.

FIG. 4 shows a side view of the apparatus for cleaning animals 100 of FIG. 1, according to an embodiment of the present disclosure. As above, the apparatus for cleaning animals 100 may include a handle 110, a substantially conical triangular head 120, and a disposable absorbent pad 130. The handle 110 includes a chamber 112 for receiving a solution and includes a brush head interface 114 so that it can be removably affixed to the substantially conical triangular head 120. The disposable absorbent pad 130 can be removably affixed to the head surface 122 and includes a plurality of apertures 132 which allow the metal bristles 125 to extend through the disposable absorbent pad 130.

Figure 5:
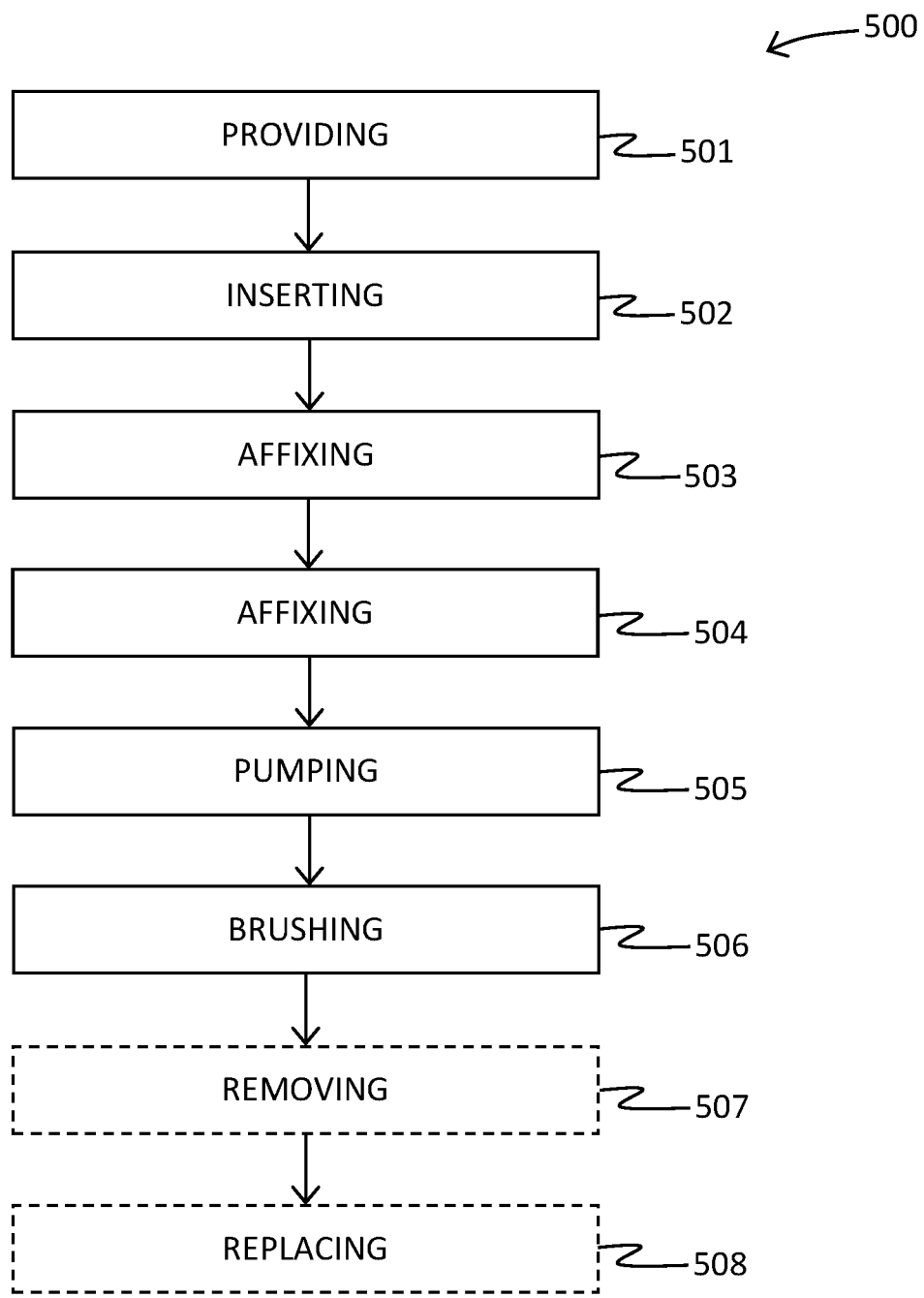
FIG. 5 is a flow diagram illustrating a method of use for the apparatus for cleaning animals, according to an embodiment of the present disclosure.

Referring now to FIG. 5, a flow diagram 550 illustrating a method for cleaning an animal 500, according to an embodiment of the present disclosure. As illustrated, the method 500 may comprise the steps of: providing 501 an apparatus for cleaning animals 100; inserting 502 the solution into the chamber 112 of the handle 110; affixing 503 the handle 110 to the substantially conical triangular head 120; affixing 504 the at least one disposable absorbent pad 130 to the substantially conical triangular head 120; pumping 505 the solution through the plurality of conduits 126; and brushing 506 an animal's fur. The method 500 may further comprise the steps of: removing 507 the at least one disposable absorbent pad 130 from the substantially conical triangular head 120 when the pad becomes soiled; and replacing 508 the at least one disposable absorbent pad 130 with a clean pad.

It should be noted that steps 507 and 508 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the apparatus for cleaning animals 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for cleaning animals comprising:
   an applicating brush including;
      a handle having
         a chamber,
         a proximal end, and
         a distal end, the distal end having
         a brush head interface;
      a substantially conical triangular head having
         a head surface,
         a plurality of bristles,
         a plurality of conduits,
         a brush handle interface, and
         a releasable pad attachment means; and
      at least one disposable absorbent pad having
         a plurality of apertures, and
         a corresponding releasable pad attachment means;
   wherein said handle is removably affixable to said substantially conical triangular head;
   wherein said chamber of said handle is configured to receive a solution and is in fluid communication with said plurality of conduits;
   wherein said substantially conical triangular head includes passages which are in fluid communication with said plurality of conduits and with said chamber; and
   wherein said at least one disposable absorbent pad is removably affixable to said head surface of said substantially conical triangular head and in such a way that said plurality of bristles and said plurality of conduits extend through said plurality of apertures.

2. The apparatus for cleaning animals of claim 1, wherein said handle includes a pump which is in fluid communication with said chamber.

3. The apparatus for cleaning animals of claim 2, wherein said handle includes a battery.

4. The apparatus for cleaning animals of claim 3, wherein said pump includes a motor which is in electrical communication with said battery.

5. The apparatus for cleaning animals of claim 4, wherein said handle includes an activation button which is in electrical communication with said battery and said motor.

6. The apparatus for cleaning animals of claim 1, wherein said handle includes a pumping button.

7. The apparatus for cleaning animals of claim 1, wherein said chamber comprises a reservoir and is configured to receive and contain said solution.

8. The apparatus for cleaning animals of claim 2, wherein said pump is manually powered.

9. The apparatus for cleaning animals of claim 1, wherein said solution is substantially fluid.

10. The apparatus for cleaning animals of claim 1, wherein said solution is provided in a. cartridge.

11. The apparatus for cleaning animals of claim 10, wherein said chamber is configured to receive said cartridge.

12. The apparatus for cleaning animals of claim 1, wherein said plurality of bristles are made of ferrous material.

13. The apparatus for cleaning animals of claim 1, wherein said plurality of bristles are made of a non-ferrous material.

14. The apparatus for cleaning animals of claim 1, wherein said plurality of bristles include a substantially spherical tip.

15. The apparatus for cleaning animals of claim 1, wherein said plurality of conduits are positioned adjacent to said plurality of bristles.

16. The apparatus for cleaning animals of claim 1, wherein said releasable pad attachment means of said substantially conical triangular head and said corresponding releasable pad attachment means of said at least one disposable absorbent pad comprise hook and loop fasteners.

17. An apparatus for cleaning animals, the apparatus for cleaning animals comprising:
an applicating brush including;
a handle having a chamber, a proximal end, and a distal end, the distal end having a brush head interface;
a substantially conical triangular head having a head surface, a plurality of bristles, a plurality of conduits, a brush handle interface, and a releasable pad attachment means; and
at least one disposable absorbent pad having a plurality of apertures, a corresponding releasable pad attachment means;
wherein said handle is removably affixable to said substantially conical triangular head;
wherein said chamber of said handle is configured to receive a solution and is in fluid communication with said plurality of conduits;
wherein said substantially conical triangular head includes passages which are in fluid communication with said plurality of conduits and with said chamber;
wherein said at least one disposable absorbent pad is removably affixable to said head surface of said substantially conical triangular head and in such a way that said plurality of bristles and said plurality of conduits extend through said plurality of apertures; and
wherein said handle includes a pump which is in fluid communication with said chamber;
wherein said handle includes a battery;
wherein said pump includes a motor which is in electrical communication with said battery;
wherein said handle includes an activation button which is in electrical communication with said battery and said motor;
wherein said solution is substantially fluid;
wherein said chamber comprises a reservoir and is configured to receive and contain a solution;
wherein said plurality of bristles are made of ferrous material;
wherein said plurality of bristles include a substantially spherical tip;
wherein said plurality of conduits are positioned adjacent to said plurality of bristles; and
wherein said releasable pad attachment means of said substantially conical triangular head and said corresponding releasable pad attachment means of said at least one disposable absorbent pad comprise hook and loop fasteners.

18. The apparatus for cleaning animals of claim 17, further comprising a set of instructions; and
wherein the apparatus for cleaning animals is arranged as a kit.

19. A method for cleaning an animal, the method comprising the steps of: providing an apparatus for cleaning animals, the apparatus comprising:
an applicating brush including;
a handle having a chamber, a proximal end, and a distal end, the distal end having a brush head interface;
a substantially conical triangular head having a head surface, a plurality of bristles, a plurality of conduits, a brush handle interface, and a releasable pad attachment means;
at least one disposable absorbent pad having a plurality of apertures, a corresponding releasable pad attachment means;
wherein said handle is removably affixable to said substantially conical triangular head;
wherein said chamber of said handle is configured to receive a solution and is in fluid communication with said plurality of conduits; and
wherein said substantially conical triangular head includes passages which are in fluid communication with said plurality of conduits and with said chamber; wherein said at least one disposable absorbent pad is removably affixable to said head surface of said substantially conical triangular head and in such a way that said plurality of bristles and said plurality of conduits extend through said plurality of apertures;
inserting said solution into said chamber of said handle;
affixing said handle to said substantially conical triangular head;
affixing said at least one disposable absorbent pad to said substantially conical triangular head;
pumping said solution through said plurality of conduits; and
brushing an animal's fur.

20. The method of claim 19, further comprising the steps of: removing said at least one disposable absorbent pad from said substantially conical triangular head when said at least one disposable absorbent pad becomes soiled; and
replacing said at least one disposable absorbent pad with a clean pad.

* * * * *